(12) United States Patent
Retter (10) Patent No.: US 10,457,368 B1
(45) Date of Patent: Oct. 29, 2019

(54) WATER PADDLE SYSTEM AND RELATED METHODS (71) Applicant: Dale Jared Retter, Scottsdale, AZ (US)

(72) Inventor: Dale Jared Retter, Scottsdale, AZ (US)

(*) Notice: Subject to any disclaimer, the term of this patent is extended or adjusted under 35 U.S.C. 154(b) by 0 days.

(21) Appl. No.: 16/191,686

(22) Filed: Nov. 15, 2018

Related U.S. Application Data (60) Provisional application No. 62/590,259, filed on Nov. 22, 2017.

(51) Int. Cl.
B63H 16/04 (2006.01)

(52) U.S. Cl.
CPC .................... B63H 16/04 (2013.01)

(58) Field of Classification Search
CPC .............. B63H 16/04; B63H 2016/043; B63H 2016/046; B63H 16/06; B63H 2016/063; B63H 16/067; B63H 16/073; B63H 16/08
USPC ........................................................ D12/215
See application file for complete search history.

(56) References Cited

U.S. PATENT DOCUMENTS

| | | | | |
|---|---|---|---|---|
| 543,650 A * | 7/1895 | Murphy | ................. | B63H 16/04 416/74 |
| 951,464 A * | 3/1910 | Stewart | ................. | B63H 16/04 416/74 |
| 2,424,605 A * | 7/1947 | Edmonson, Jr. | ....... | B63H 16/06 440/107 |
| 3,677,216 A | 7/1972 | Gentemann | | |
| 5,851,132 A | 12/1998 | Merrill | | |
| 6,022,255 A * | 2/2000 | Lukanovich | ........... | B63H 16/04 440/101 |
| 6,261,141 B1 | 7/2001 | Heap | | |
| 2007/0184729 A1 | 8/2007 | Kicker | | |
| 2011/0011432 A1 | 1/2011 | Yakos et al. | | |
| 2011/0189910 A1 | 8/2011 | Sakellarides | | |
| 2013/0074288 A1 * | 3/2013 | Johnson | ................. | B63H 16/04 16/421 |
| 2013/0266442 A1 | 10/2013 | Lass | | |
| 2017/0055508 A1 | 3/2017 | Shiflett, Jr. | | |

FOREIGN PATENT DOCUMENTS

CA    2337299 A1    8/2002

OTHER PUBLICATIONS

International Search Report and Written Opinion, PCT Patent Application No. PCT/US2018/061950, dated Feb. 4, 2019, 7 pages.

* cited by examiner

Primary Examiner — Andrew Polay
(74) Attorney, Agent, or Firm — Adam R. Stephenson, Ltd.

(57) ABSTRACT

Implementations of paddles may include at least one paddle blade coupled to a shaft, a sleeve coupled over the shaft, the sleeve including a helical opening, a locator pin coupled to the shaft and extending through the helical opening, and a first handle fixedly coupled to the sleeve. The paddle blade may be configured to rotate from a first position corresponding to the locator pin positioned at a first location in the helical opening to a second position corresponding to the locator pin positioned at a second location in the helical opening.

20 Claims, 4 Drawing Sheets

FIG. 9 though the helical opening. Implementations may include a locator
WATER PADDLE SYSTEM AND RELATED METHODS

CROSS REFERENCE TO RELATED APPLICATIONS

This document claims the benefit of the filing date of U.S. Provisional Patent Application 62/590,259, entitled "Kayak and Canoe Paddle Gripping System Enabling Rotation of the Paddle Blades About the Longitudinal Axis without a Rotation of the Forearms Bending or Rotation of the Wrists or Hands or a Shifting of the Grip" to Dale Jared Retter which was filed on Nov. 22, 2017, the disclosure of which is hereby incorporated entirely herein by reference.

BACKGROUND

1. Technical Field

Aspects of this document relate generally to hand-held-water paddles, such as canoe and kayak paddles. More specific implementations involve self-feathering paddles.

2. Background

Many small water-craft are propelled by handheld paddles. A paddle stroke of a one-bladed paddle has two basic components: a power stroke where the blade of the paddle is pulled through the water towards the stern of the watercraft, and a return stroke where the blade of the paddle is moved through the air towards the bow of the watercraft. Repeating this sequence results in forward propulsion because the water resistance of the power stroke is greater than the air resistance of the return stroke.

SUMMARY

Implementations of paddles may include at least one paddle blade coupled to a shaft, a sleeve coupled over the shaft, the sleeve including a helical opening, a locator pin coupled to the shaft and extending through the helical opening, and a first handle fixedly coupled to the sleeve. The paddle blade may be configured to rotate from a first position corresponding to the locator pin positioned at a first location in the helical opening to a second position corresponding to the locator pin positioned at a second location in the helical opening.

Implementations of paddles may include one, all, or any of the following:

The paddle may include a second handle coupled around the shaft.

The second handle may be fully rotatable about the shaft.

The first handle may be configured to rotate a predetermined number of degrees not more than 90 degrees.

The helical opening may include a first locking section at a first end of the helical opening and a second locking section at a second end of the helical opening.

The locator pin may include a bearing.

The sleeve may include a second helical opening.

Movement of the first handle along a length of the shaft may be configured to be adjustably restricted.

The sleeve may be configured to slide along a length of the shaft a predetermined distance not more than a length of the helical opening from a first end of the helical opening to a second end of the helical opening.

Implementations of paddles may include a first paddle blade coupled to a first end of a shaft, a second paddle blade coupled to a second end of the shaft opposite the first end, and a sleeve coupled over the shaft. The sleeve may include a helical opening. Implementations may include a locator pin coupled to the shaft and extending through the helical opening, a first handle coupled to the shaft and fixedly coupled to the sleeve, and a second handle coupled to shaft. The sleeve may be configured to slide along a length of the shaft from a first position to a second position. The shaft may be configured to rotate relative to the sleeve when the sleeve slides along the length of the shaft from the first position to the second position.

Implementations of paddles may include one, all, or any of the following:

The second handle may be configured to fully rotate about the shaft.

The helical opening may include a first non-helical end and a second non-helical end.

The helical opening may extend not more than 90 degrees.

The first handle and the second handle may include a compressible material.

Implementations of paddles may include a paddle blade coupled to a first end of a shaft, a sleeve coupled over the shaft, the sleeve including a helical opening, a locator pin coupled to the shaft and extending through the helical opening, a spring coupled over the shaft between the sleeve and the paddle blade, and a first handle fixedly coupled to the sleeve.

Implementations of paddles may include one, all, or any of the following:

The paddle may be a canoe paddle

The shaft may be configured to rotate relative to the sleeve a predetermined number of degrees not more than 90 degrees.

The locator pin may include a bearing.

The first handle may be slidably coupled to the shaft.

The spring may be configured to compress during a paddle stroke.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended paddles will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such paddles, and implementing components and methods, consistent with the intended operation and methods.

Implementations of paddles disclosed herein are illustrated as, and may be referred to, as kayak paddles or canoe paddles. It is understood that the implementations of paddles described herein may also be applied to paddles used for a watercraft that is not a kayak or a canoe, such as, by non-limiting example, row-boats, dragon boats, fishing boats, paddle boards, or any other hand-held paddle powered watercraft. Further, the illustrations of the paddles herein may not always be to scale but may show the relative relation between the various components of the paddles.

For both one-bladed and two-bladed paddles, efficiency may be gained by increasing the resistance of the power stroke and decreasing the resistance of the return stroke. This is achieved by orienting the flat surface of the blade largely perpendicular to the direction of motion on the power stroke and more parallel to the direction of motion on the return stroke. As used herein, this rotational process is referred as feathering. The implementations of the paddles disclosed herein may be considered self-feathering paddles as they may allow for the feathering of a paddle without requiring a rotation of the forearm, a bending of the wrists, and/or a shifting of the paddle grip.

Figure 1:
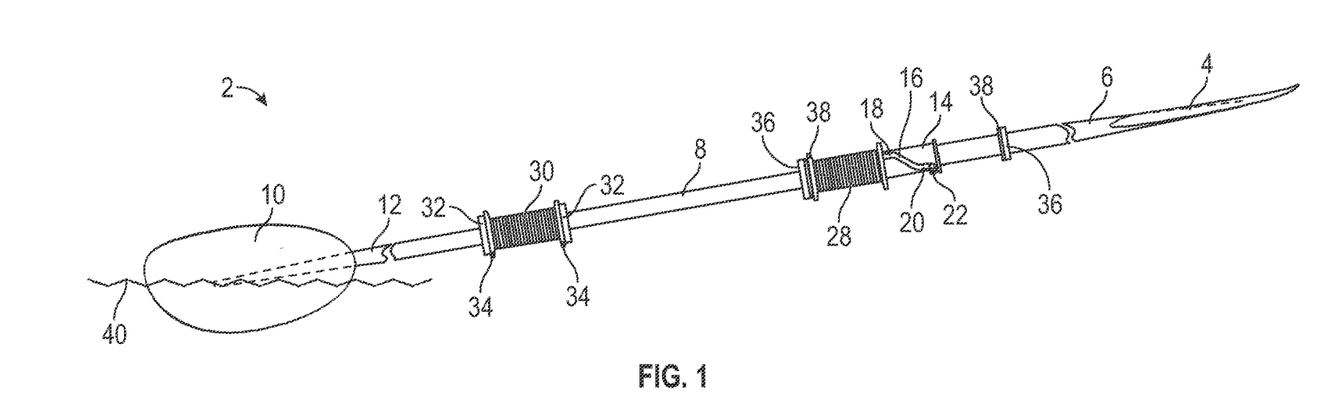
FIG. 1 is a view of an implementation of a paddle in a first position.

Referring to FIG. 1, a view of an implementation of a paddle in a first position is illustrated. The paddle 2 of FIG. 1 is a double bladed paddle. In the implementation illustrated by FIG. 1, the paddle 2 includes a first paddle blade 4 coupled to a first end 6 of a shaft 8 and a second paddle blade 10 coupled to a second end 12 of the shaft 8. The paddle blades 4 and 10, and any other paddle blade disclosed herein, may be made from wood, plastic, carbon fiber, any other material, or any combination thereof. In particular implementations the paddle blades may be made from a strong, light weight molded plastic or resin material that may be reinforced with glass or carbon fiber. As illustrated by FIG. 1, the first paddle blade 4 may be attached to the shaft 8 at a different angle of rotation as compared to the second paddle blade 10 attached to the shaft 8. This allows a face of one blade to be perpendicular to its direction of motion during its power stroke, or the movement of a particular power blade through the water, while a face of the other blade is simultaneously less perpendicular and more parallel to its direction of motion. As used herein, the difference between the angle of the paddle blades relative to the shaft 8 is referred to as the rotational offset of the paddle. The rotational offset of a paddle may range from more than 0-degrees to 90-degrees. In various implementations, and as illustrated by FIG. 1, the rotational offset between the first paddle blade 4 and the second paddle blade 10 may be 90 degrees. In other implementations, the rotational offset between the first paddle blade 4 and the second paddle blade 10 may be, by non-limiting example, 30 degrees, 45 degrees, 60 degrees, or any other number of degrees between 0 and 90.

The paddle 2 includes a shaft 8 which may be a single and continuous shaft fixedly coupled to the first paddle blade 4 and the second paddle blade 10. As used herein, the length of the shaft refers to the length between the first end 6 and the second end 12 of the shaft. In other implementations, the shaft may include separate right and left sections and/or a separate middle portion of the shaft which may then be attached to each other. In various implementations, the shaft may be assembled in various configurations resulting in various degrees of rotational offsets of the paddle blades. The shaft of the paddle may include any material disclosed herein and in particular implementations may be made from extruded aluminum, plastic or resin reinforced with glass or carbon fiber. In various implementations, as illustrated by FIG. 1, the shaft may taper (narrow) in and near the sections that join it to the paddle blades. The shaft 8 may be hollow.

Figure 2:
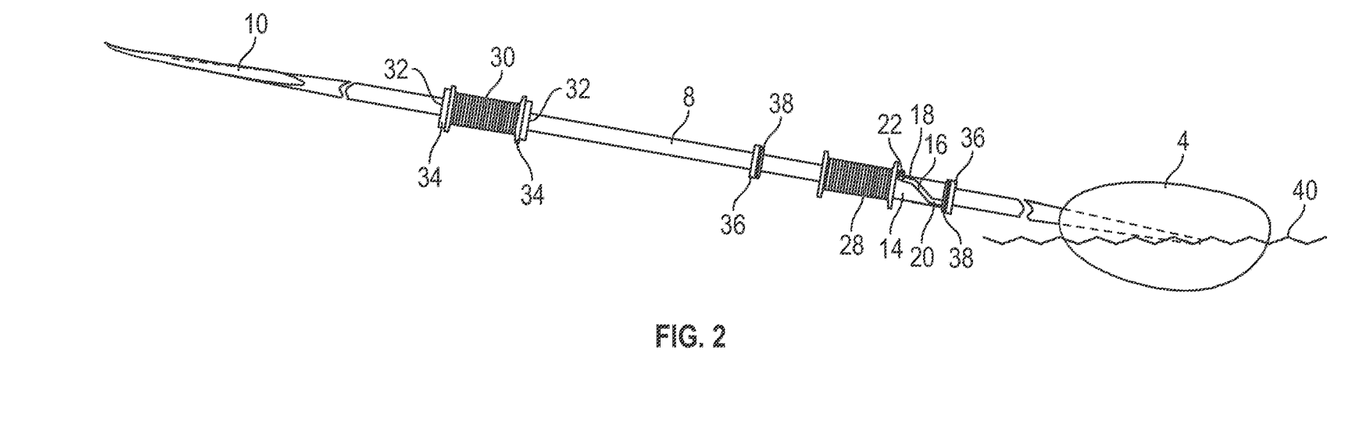
FIG. 2 is a view of the paddle of FIG. 1 in a second position.
Figure 3:
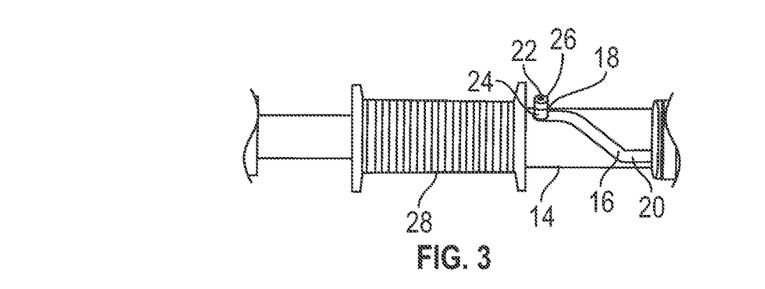
FIG. 3 is a view of the sleeve and a handle of the paddle of FIG. 2.

Still referring to FIG. 1, the paddle 2 may include a sleeve 14 coupled over the shaft 8. As illustrated by FIG. 1, the sleeve 14 is in a first position. In various implementations, the sleeve 14 may be tubular and may surround a circumference of the shaft 8. The sleeve 14 may be made from, by non-limiting example, a metal or plastic. In particular implementations, the sleeve 14 could be made of hard low friction plastic material marketed under the tradename of TEFLON® by The Chemours Company of Wilmington Del., or an oil infused sintered metal such as bronze. The sleeve 14 may include a helical opening 16. As illustrated herein, the helical opening 16 extends entirely through the sleeve 14, however, in other implementations, rather than a helical opening the sleeve may include a helical groove similar to the openings disclosed herein with the difference being that the groove does not extend entirely through the sleeve. Referring to FIG. 3, a view of the sleeve and a first handle 28 of the paddle of FIG. 1 is illustrated (though in a different position from the sleeve and handle of FIG. 1.) In various implementations, the length of the helical opening may be three inches, while in other implementations the length of the helical opening may be more or less than three inches. In various implementations, the angle between a first end 18 of the helical opening 16 and a second end 20 of the helical opening, as arranged about the circumference of the sleeve 14, may match the angle of rotational offset between the first paddle blade 4 and the second paddle blade 10. Put another way, in various implementations the helical opening may extend not more than 90 degrees about a circumference of the shaft 8, and in particular implementations, may extend, by non-limiting example, 30 degrees, 45 degrees, 60 degrees, and any other number of degrees up to 90 degrees about a circumference of the shaft 8. In various implementations, and as illustrated by FIGS. 1-3, the helical opening 16 may include a first end 18 that is non-helical and a second end that is non-helical 20. In such implementations, the helical opening 16 may include short straight sections at ends of the open path, that deviate from the angled helical slant of the middle portion of the opening and may be parallel to the paddle shaft 8. In such implementations, the non-helical ends may serve as a first locking section and a second locking section as they may prevent unwanted paddle rotation during a power stroke of a paddle. More specifically, when the locator pin 22 is within the non-helical end portion, the restriction of the rotational movement of the paddle blades may be increased.

Figure 4:
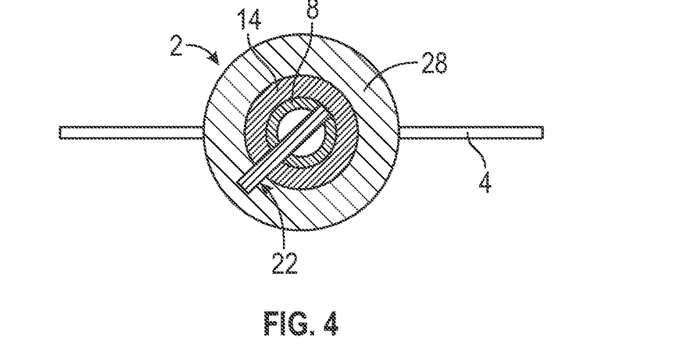
FIG. 4 is a cross-sectional front view of the paddle of FIG. 1 in a first position.

Referring back to FIG. 1, the paddle 2 may include a locator pin 22. The locator pin may be directly and fixedly coupled to the shaft 8. The locator pin may extend from the shaft 8 and entirely through the helical opening 16 (meaning that the pin 22 extends above an outer surface of the helical opening). In other implementations, the locator pin 22 may only partially extend through the helical opening 16, or, in implementations have a helical groove rather than a helical opening, the locator pin 22 may extend into the helical groove. The locator pin 22 may be polished and/or lubricated to reduce friction when the entrapping helical opening 16 in the sleeve 14 moves relative to the pin. In a particular implementation, and as illustrated by FIG. 3, the locator pin 22 may include a base portion 24 configured to directly interact with the sleeve 14. The base portion 24 may be configured to rotate to minimize resistance and wear from the interaction between the base portion 24 and the sleeve 14. In particular implementations, the base portion 24 may rotate about a bearing included in the locator pin 22. The bearing may be lubricated. In particular implementations, the bearing may include ball bearings. While FIG. 3 illustrates a top portion 26 over the base portion 24 of the locator pin 22, in other implementations the base portion 24 and the top portion 26 may be a single rotatable portion which may or may not utilize a bearing. The locator pin 22 may be coupled to the shaft 8 using any coupling mechanism, such as a bolt, a screw, or an adhesive, and in particular implementations, the locator pin may be removably coupled to the shaft 8. In other implementations, the locator pin 22 may be integrally formed as part of the shaft 8. Referring to FIG. 4, a cross-sectional front view of the paddle of FIG. 1 in a first position is illustrated. In various implementations, and as illustrated, the locator pin 22 may extend through an interior of the shaft 8 and be coupled to multiple sides of the shaft. In other implementations, the pin 22 may be directly coupled to only a single side of the shaft 8. The locator pin may be made of a hard material such as, by non-limiting example, stainless steel.

The sleeve 14 is configured to move along a length of the shaft from a first position to a second position. In various implementations, the sleeve may be configured to slide along the length of the shaft a predetermined distance of not more than four inches. In other implementations, the sleeve may be configured to slide along the shaft more than four inches. In turn, the shaft may be configured to rotate relative to the sleeve when the sleeve slides along the length of the shaft from the first position to the second position as the movement along the length of the shaft of the helical opening 16 may force the locator pin 22 to move within the pathway provided by the helical opening. This movement of the pin 22 within the helical opening 16 forces the locator pin 22 to be moved up or down (according to the orientation of FIGS. 1-3), thereby causing the shaft 8 it is connected to, and attached paddle blades 4 and 10, to rotate relative to the non-rotating sleeve 14 (which is non-rotating as it may be gripped by a paddler). The amount of rotation of the paddles may be adjusted and/or determined based upon the length of the helical opening and the angle between the first end of the helical opening and the second end of the helical opening.

As illustrated by FIGS. 1-3, the sleeve 14 includes a single helical opening 16. However, in other implementations, the sleeve 14 may include multiple helical openings of different lengths and/or radial offsets between their end points. This would allow the paddler to select to have the locating pin pass through the opening that produced the desired paddle rotation.

In implementations including multiple helical openings, the locator pin 22 may be spring loaded so it could be depressed below the inner surface of the sleeve 14 while the sleeve is rotated to various helical openings. The locator pin 22 may then pop up and engage with any of the helical openings included in the sleeve. In similar implementations, the sleeve may include a locked opening which may be configured to receive the locator pin but may not allow the locator pin to travel within the helical opening. In such implementations, the rotation of the paddle relative to the sleeve may be locked. In other implementations, other locking mechanisms may be used to prevent movement of the sleeve along the shaft, and in turn, prevent rotation of the paddle blades. Such locking mechanisms may include, by non-limiting example, a clamp placed over the sleeve or locator pin to prevent movement of the locator pin, a clamp placed next to the sleeve about the shaft to prevent movement of the shaft, or any other locking mechanism.

While the implementations disclosed herein generally include a locator pin fixedly coupled to the shaft and extending through an opening in the sleeve, in other implementations the locator pin may be fixed to the sleeve such that it protrudes radially inwards through a helical opening or groove in the shaft. This opening or groove may be similar to any helical opening disclosed herein. Like the implementations having the locator pin fixed to the shaft, in this implementation the forced movement of the locator pin through a helical opening will cause the shaft to rotate relative to the non-rotating sleeve. Either locator pin and helical opening construction configuration can be used in any of the paddles disclosed herein.

Still referring to FIGS. 1-3, the paddle 2 includes a first handle 28. In the implementations disclosed herein, the first handle is fixedly coupled to the sleeve 14. The first handle may be coupled between the sleeve 14 and the first paddle blade 4 or between the sleeve and the second paddle blade 10. Because the first handle 28 is fixedly coupled to the sleeve 14, the rotational movement of the first handle 28 relative to the shaft 8 corresponds to the rotational movement of the sleeve 14 relative to the shaft 8. Similarly, the amount the first handle 28 may traverse the length of the shaft 8 corresponds to the amount the sleeve 14 may traverse the length of the shaft 8. In various implementations, the first handle 28 may be fixedly coupled over a portion of the sleeve. In such implementations, the first handle 28 may leave the helical opening 16 exposed. In other implementations, the first handle 28 may be coupled over the sleeve and the helical opening. In such implementations, the first handle 28 may be configured as to not interfere with the movement of the locator pin 22 within the helical opening. Similarly, in implementations having the locator pin fixedly coupled to the sleeve and the shaft including the helical opening, the handle may be formed over substantially all of the sleeve as it would no longer interfere with the movement of the locator pin within the helical opening or groove of the shaft.

Referring to FIG. 1, in various implementations, the paddle 2 may include a second handle 30. The second handle 30 may be rotatably coupled to the shaft 8. In various implementations, the second handle may freely rotate about the entire circumference of the shaft 8. In other implementations, the second handle may be configured to rotate at least as much as the first handle 28. As illustrated by FIG. 1, the second handle 30 may include a first set of restraining rings 32 coupled to either side of the second handle 30. The restraining rings may be locked in place and may prevent movement of the second handle 30 along the length of the shaft 8. The restraining rings may be made from any material disclosed herein. In various implementations, the paddle 2 may include a low friction washer 34 coupled between the ends of the second handle 30 and the restraining rings 34. The low friction washers may be made from any material disclosed herein and may reduce friction caused by pressure between the second handle 30 and the restraining rings 32.

In various implementations, the first handle 28 and the second handle 30 may include hand grips configured in a size and shape which may be comfortably grasped by a human hand. The hand grips may include a foam material. The hand grips may be textured or covered on their outer surface were a paddler's hands may contact them with a soft textured material such as silicone rubber with a high coefficient of friction. The hand grips may be radially symmetric. Because a paddler need not loosen their grip on the handles in order to rotate the paddle, hand grips may be utilized without interfering with the rotation of the paddle, including hand grips with a more ergonomically asymmetric cross section such as an oval. In implementations having a unique grip, such as an oval or grip configured to match the contours of a hand, the grips may ensure proper holding and use of the paddle in low-light conditions. The handles may have a low coefficient of friction between their cylindrical central openings where they contact the shaft 8 to facilitate easy rotation of the shaft 8 within the cores of the handles.

In various implementations, the paddle 2 may include a second set of restraining rings 36 coupled on either side of the first handle 28 and the sleeve 14. The second set of restraining rings 36 may be the same as or similar to the first set of restraining rings and may be configured to restrict the movement of the first handle 28 and the sleeve 14 along the length of the shaft 8 to a length of the shaft 8 between the second set of restraining rings 36. In other implementations, there is no second set of restraining rings and the movement of the first handle 28 and the sleeve 14 may be restricted by the locator pin 22. In implementations including the second set of restraining rings 36, the paddle 2 may include a plurality of shock absorbing washers 38 coupled between the restraining rings 36 and the first handle 28 coupled to the sleeve 14. The shock absorbing washers 38 may be configured to absorb the shock of the first handle 28 colliding with a restraining ring and/or the sleeve 14 colliding with the restraining ring. The shock absorbing washer may be made from, by non-limiting example, a rubber or plastic.

In various implementations, any of the sleeve, first and second handles, locator pin, first set of restraining rings, low friction washers, second set of restraining rings, or shock absorbing washers may be configured to be coupled to an existing paddle by a paddler. Likewise, in various implementations a paddler may be able to adjust the positioning of any of these elements, and in turn, customize the amount of rotation of the paddle blades. In such implementations, the sets of restraining rings may include radially-oriented set screws that when screwed inwards towards the shaft, the screws will hold the rings in fixed positions. When the screws are loosened the rings may slide along the length of the shaft to allow for selected re-positioning of the hand grips and their attached parts. When these restricting rings are located in a desired position, the set screws could be screwed down toward the paddle shaft to lock the restricting rings into their desired locations. To ensure that these restraining rings do not slide along the paddle shaft during periods of stress, small holes or indentations in the paddle shaft may be provided in certain paddles to allow for the set screws to protrude into these indentations or holes when the set screws are properly aligned with these holes or indentations, and screwed down inward toward the center of the shaft. Similarly, the locator pin may be screwed into or otherwise attached at a position appropriately corresponding to the desired position of the first handle.

The ability to relocate the restraining rings in this manner will allow a paddler to adjust the position of the handles to most closely conform to a particular paddle paddler's desired preference. The ability to adjust the spacing between the retraining rings used to restrict the movement along the length of the shaft of the movable handle (in the illustration of FIG. 1, the right handle), would allow the paddler to reduce the allowed movement along the length of the shaft of the hand grip assembly and thereby reduce the maximum paddle shaft rotation. For example, if 90 degrees of paddle rotation was not desired, reducing the space between the restraining rings 36 would reduce the amount of paddle rotation produced. Further, in other implementations the amount the sleeve is configured to travel, and in turn the amount the shaft is configured to rotate relative to the sleeve, may be adjusted using other adjusting mechanisms. Such adjusting mechanisms may include, by non-limiting example, a clamp placed over the sleeve to limit movement of the locator pin, a clamp placed over the shaft to limit movement of the sleeve along the shaft, or any other adjusting mechanism.

Referring to FIG. 1, the paddle 2 and paddle blades are in a first position and the locator pin 22 is in a first location in the helical opening. As illustrated, the second paddle blade 10 is within the water 40. The second paddle blade 10 is illustrated in a vertical position relative to a water surface that would be directly beneath it. The first paddle blade 4 is illustrated attached to the shaft 8 parallel to a water surface directly beneath it and therefore rotated 90 degrees relative to the second paddle blade 10. As illustrated, the locator pin 22 is positioned at a second end 20 of the helical opening in the sleeve. Accordingly, the first handle 28, and the sleeve 14, are located as close to the second paddle blade 10 as possible. As illustrated, the second paddle blade 10 is lower than the first paddle blade 4 when the second paddle blade is in the water.

Figure 5:
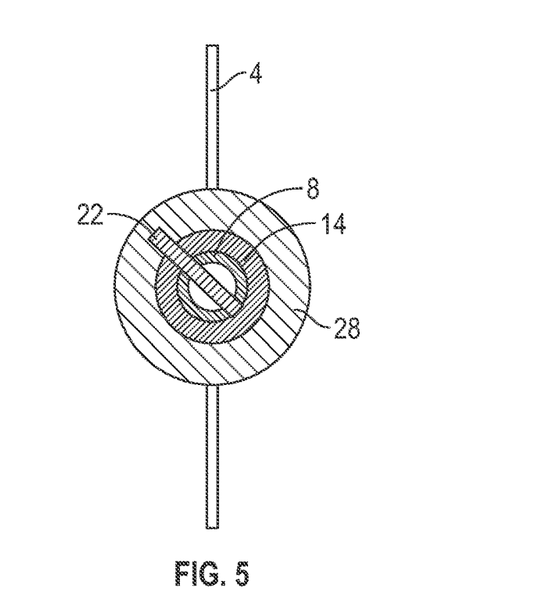
FIG. 5 is a cross-sectional front view of the paddle of FIG. 2 in a second position.

Referring to FIG. 2, a view of the paddle (and paddle blades) in a second position is illustrated. The locator pin 22, as illustrated, is now in second location within the helical opening 16. As illustrated, the first paddle blade 4 is now in the water 40 and perpendicular to the water's surface. The second paddle blade 10 is now over the water and parallel to the water's surface. The first handle 28 and the sleeve 14 are also in a second position, with the locator pin 22 positioned at a first end 18 of the helical opening 16. In the implementation illustrated by FIG. 2, the first handle 28 and the sleeve 14 are located as close to the first paddle blade as possible. The rotation of the first handle 28, the second handle 30, and the sleeve 14 are the same between the first position and the second position, however, the location of the first handle 28 and the sleeve 14 are in a different location along the length of the shaft and the shaft (and paddle blades) in turn are rotated 90 degrees. Accordingly, the paddle blades are configured to rotate from the first position, as illustrated by FIG. 1, to the second position, as illustrated by FIG. 2. The difference between the first position of FIG. 1 and the second position of FIG. 2 is further illustrated by FIG. 4, which is a cross-sectional side view of the paddle of FIG. 1 in a first position, and FIG. 5, which is a cross-sectional side view of the paddle of FIG. 2 in a second position. As illustrated, the position of the locator pin 22 remains constant relative to the position of the first paddle blade 4 and the shaft 8. In turn, the locator pin and the shaft rotate within the sleeve 14. As a paddler moves the first handle 28 from left to right, relative to the paddle shaft, while the paddler is simultaneously grasping the second handle 30, this movement will produce rotation of the shaft 8 and the attached blades 4 and 10. Subsequently, moving the first handle 28 and attached sleeve 14 from right to left along the length of the shaft will reverse this rotation and return the paddle shaft and blades to its first starting position. In various implementations, gravity may assist a paddler in sliding the first handle 28, and in turn rotating the shaft 8, in the proper orientation to propel a watercraft forward. A mirror image embodiment would allow similar operation with the paddler's left hand traveling along the length of the shaft in order to produce intended paddle rotation. This paddle shaft and blade rotation, is achieved without any rotation of either the left or right-handles. Thus, when the paddle blade immersed in the water is perpendicular to the path of movement of the watercraft, as the paddle blade is pushed backwards it will produce a forward force. The opposing paddle blade, as it is pushed forward, will present minimal surface area to any headwind. In this manner, the paddle may be considered self-feathering as it rotates with the movement of a single handle along the length of the shaft.

While the implementations disclosed herein include the first handle, the sleeve, and the locator pin on the right side of the paddle (as oriented in FIGS. 1-2), in other implementations the first handle, the sleeve, and the locator pin may be located on the left side of the paddle (as oriented in FIGS. 1-2). Further, in other implementations the first paddle blade 4 and the second paddle blade 10 may be detachable from the shaft 8. In such implementations, the first paddle blade 4 and the second paddle blade 10 may be able to switch locations, thus allowing the sliding handle to be a right-handed or a left-handed handle. In various implementations, the helical opening 16 of the sleeve 14 may be oriented in the opposite direction, resulting in the paddle blades rotating in an opposite direction than what is illustrated by FIGS. 1-2.

Figure 6:
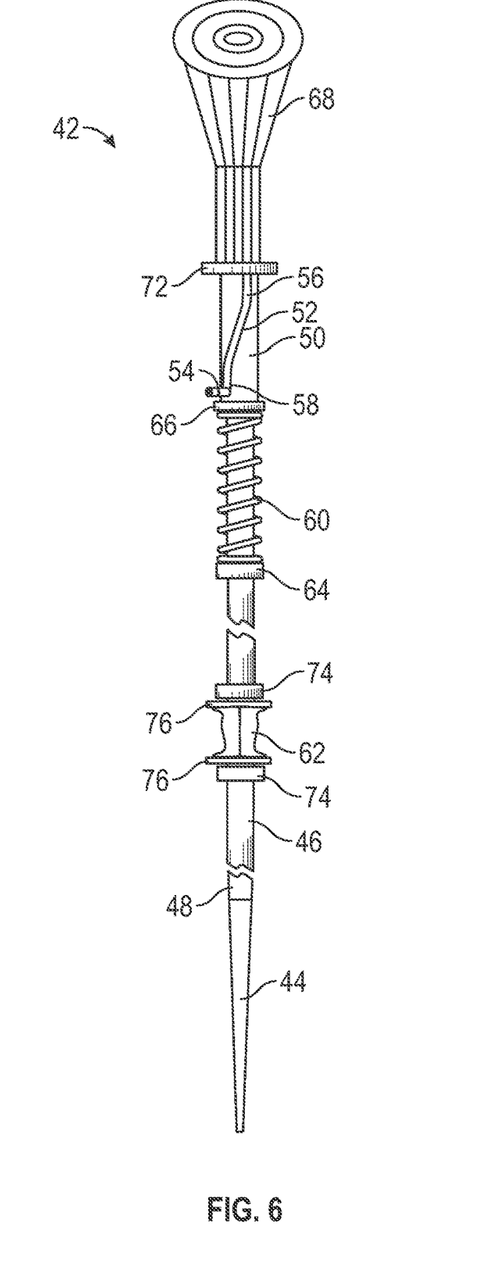
FIG. 6 is a view of another implementation of a paddle in a first position.

Referring to FIG. 6, a view of another implementation of a paddle in a first position is illustrated. The paddle 42 is a single bladed paddle. In various implementations, the paddle 42 may include a single paddle blade 44. The paddle blade 44 is coupled to a first end 48 of a shaft 46. The paddle blade 44 may be the same as or similar to any paddle blade disclosed herein. Likewise, the shaft may include properties the same as or similar to those of any shaft disclosed herein.

The paddle 42 includes a sleeve 50 coupled over the shaft 46. The sleeve may be the same as or similar to any sleeve disclosed herein. As such, the sleeve may include a helical opening 52 which may be the same as or similar to any helical opening or groove disclosed herein. The paddle may also include a locator pin 54. The locator pin 54 may be the same as or similar to any locator pin disclosed herein. When the sleeve 50 is moved up or down (according to the orientation of the paddle 42 as illustrated by FIG. 6) along a length of the shaft the movement of the helical opening 52 may force the locator pin 54 to move within the pathway provided by the helical opening. This movement of the pin 54 within the helical opening 52 forces the locator pin 54 to be rotated side to side (according to the orientation of the paddle 42 as illustrated by FIG. 6), thereby causing the shaft 46 it is connected to, and the attached paddle blade 44, to rotate relative to the non-rotating sleeve 50. The amount of rotation of the paddle blades and shaft may be adjusted and/or determined based upon the length of the helical opening and the radial offset or angle between the first end 56 of the helical opening 50 and the second end 58 of the helical opening 50. The amount of rotation of the shaft 46 may be the same as the radial offset between the first end 56 and the second end 58 of the helical opening 50. In various implementations, the shaft may be configured to rotate, relative to the sleeve, not more than 90 degrees. In particular implementations, the shaft may be configured to rotate, by non-limiting example, 30 degrees, 45 degrees, 60 degrees, or any other number of degrees up to 90 degrees. In other implementations, the shaft, and in turn the paddle blades, may be configured to rotate more than 90 degrees, with particular implementations configured to rotate as many as 235 degrees or more.

While the implementations disclosed herein generally include a locator pin fixedly coupled to the shaft and extending through an opening in the sleeve, in other implementations the locator pin may be fixed to the sleeve such that it protrudes radially inwards through a helical opening or groove in the shaft. This opening or groove may be similar to any helical opening disclosed herein. Like the implementations having the locator pin fixed to the shaft, in this implementation the forced movement of the locator pin through a helical opening will cause the shaft to rotate relative to the non-rotating sleeve.

In various implementations, the paddle 42 may include a spring 60 coupled over the shaft 46 and between the sleeve 50 and the paddle blade 44. The spring may have as much or more resistance to compression as required to support the entire weight of the first handle 68, the sleeve 50, a paddler's hand, and a paddler's arm. In other implementations, the spring may have less resistance to compression as required to support the entire weight of the first handle 68, the sleeve 50, a paddler's hand, and a paddler's arm. In various implementations, the coiled spring could be made of non-rusting stainless steel spring metal. As illustrated by FIG. 6, the paddle 42 may include a first spring support ring 64 fixedly coupled to the paddle shaft 46 and having a diameter greater than the diameter of the spring 60. In various implementations, the paddle 42 may also include a second spring support ring 66. The second spring support ring may be fixedly coupled to either the shaft 46 or the sleeve 50 and may have a diameter greater than the diameter of the spring 60.

In other implementations, the paddle 42 may not include a spring and the sleeve 50 may be configured to slide along the shaft 46 without the resistance of the spring. In such implementations, the paddle 42 may include a restraining ring, which may be the same as or similar to any restraining ring disclosed herein, in place of the spring support ring 64. The paddle 42 may also include a shock absorbing washer between the restraining ring and the sleeve 50. The shock absorbing washer may be any type of shock absorbing washer disclosed herein.

Figure 8:
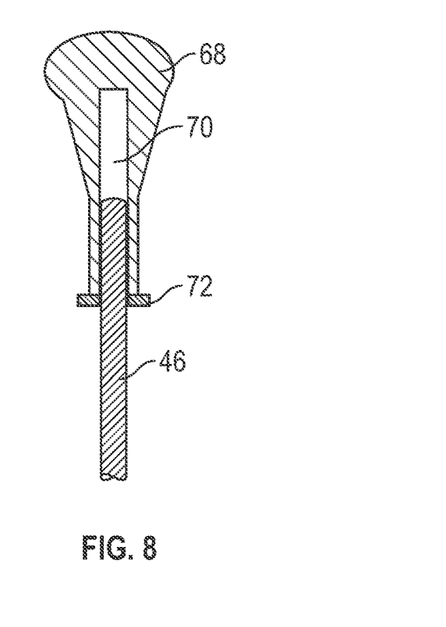
FIG. 8 is a cross-sectional front view of a handle of the paddle of FIG. 1 in a first position.
Figure 11:
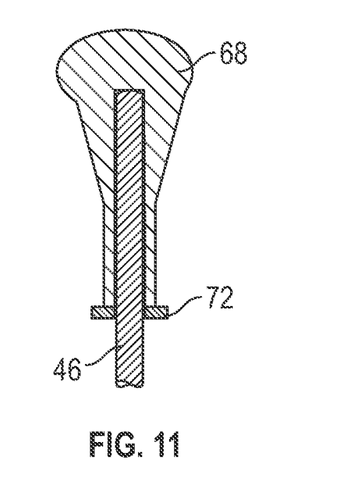
FIG. 11 is a cross-sectional front view of the handle of the paddle of FIG. 9 in a second position.

The paddle 42 includes a first handle 68 coupled to the shaft 46, which in particular implementations, may be slidably coupled to the shaft 46. The first handle 68 is also fixedly coupled to the sleeve 50, thus any rotational movement or movement of the first handle parallel to the length of the shaft will correspond with movement of the sleeve (and vice versa). The first handle 68 may include any material disclosed herein, such as a hard plastic. Referring to FIG. 8, a cross-sectional front view of a handle of the paddle of FIG. 6 in a first position is illustrated. As illustrated by FIG. 8, the first handle 68 may include a hollow cylindrical opening configured to receive a portion of the shaft 46. As illustrated by FIG. 8, the shaft 46 does not fill the opening 70, however, and as illustrated by FIG. 11, when the paddle 42 is in a second position, the shaft 46 may fill the opening 70. The shaft 46 may be configured to slide within the opening 70 and rotate within the opening 70. The opening 70 may have a low coefficient of friction between itself and the paddle shaft 46. Its outer surface may be textured and have a higher coefficient of friction were a paddler's hand may contact it when it is grasped. Referring back to FIG. 6, the paddle 42 may include a hand guard 72 fixedly coupled to the first handle 68. The hand guard 72 may prevent a paddler's hand from inadvertently sliding downward past this guard.

Referring back to FIG. 6, the paddle 42 may include a second handle 62 rotatably coupled to the shaft 46. The second handle may be the same as any handle previously disclosed herein and may include a hand grip the same as or similar to any hand grip disclosed herein. The paddle 42 may also include a set of restraining rings 74 fixedly coupled to the shaft 46 on either side of the second handle 62. The restraining rings 74 may be the same as or similar to any restraining rings disclosed herein. The paddle 42 may also include low friction washers 76 coupled between the second handle 62 and the restraining rings 74 which may be the same as or similar to any low friction washers disclosed herein.

In various implementations, the second handle 62 may be repositioned by a paddler through adjusting the set of restraining rings. Similarly, in various implementations the amount the paddle may rotate may also be adjusted by adjusting the length of the spring and/or the position of the spring support ring 64 (or restraining ring in implementations not having a spring). The amount the paddle blade rotates may also be adjusted, or locked, using any adjusting or locking mechanism disclosed herein.

Referring to FIG. 6, the paddle 42 and paddle blade 44 are in a first position and the locator pin 54 is in a first location in the helical opening 52. In various implementations, and as illustrated, the first location may be the same as the second end 58 of the helical opening. In such implementations, the sleeve 50 and the handle 68 may be positioned as far away from the paddle blade 44 as possible.

Figure 7:
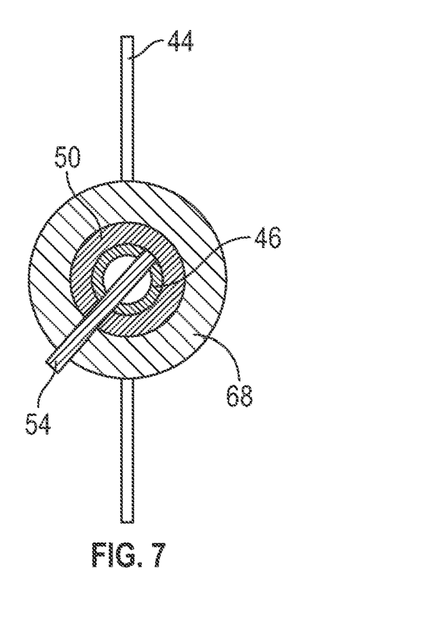
FIG. 7 is a cross-sectional top view of the paddle of FIG. 6 in a first position.
Figure 9:
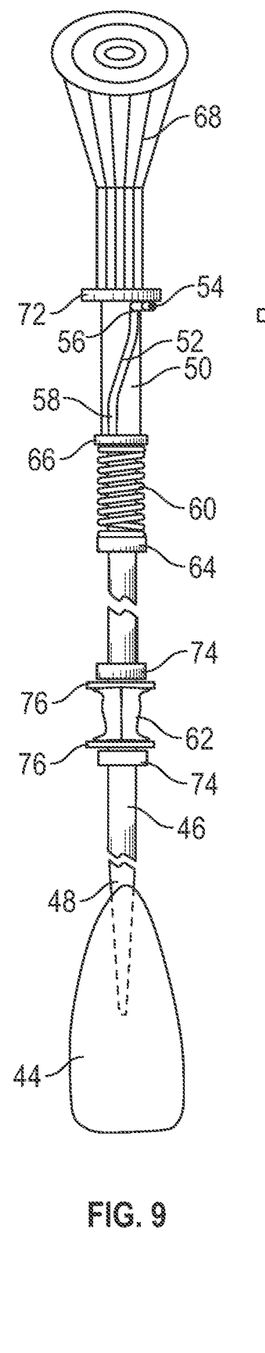
FIG. 9 is a view of the paddle of FIG. 6 in a second position.
Figure 10:
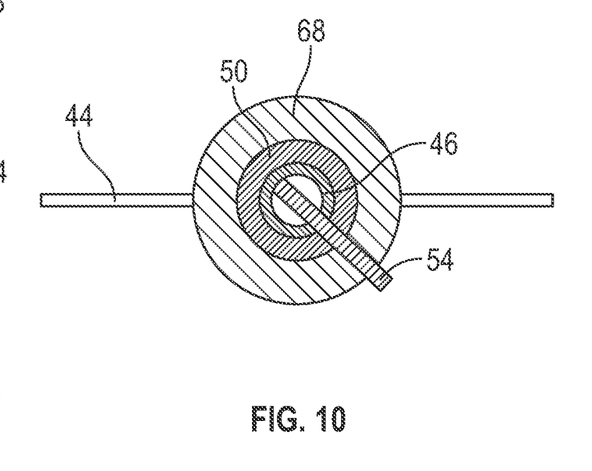
FIG. 10 is a cross sectional top view of the paddle of FIG. 9 in a second position.

Referring to FIG. 9, a view of the paddle of FIG. 6 (and paddle blade) in a second position is illustrated. The locator pin 54, as illustrated, is now in second location within the helical opening 52, which may correspond to the first end 56 of the helical opening. As illustrated, the paddle blade 44 is now rotated 90 degrees relative to the position of the paddle blade in the first position. The sleeve 50 is also in a second position, with the locator pin 54 positioned at a first end 56 of the helical opening 52. Referring to FIG. 11, the first opening 70 within the first handle 68 is also filled by the shaft 46 as the first handle 68 is moved towards the paddle blade 44. As illustrated by FIG. 9, the movement of the first handle 68 towards the paddle blade 44 may compress the spring 60 as the sleeve 50 slides down the shaft 46. As disclosed herein, the spring 60 may be configured to compress during a portion of a paddle stroke. The paddle blade 44 is configured to rotate from the first position, as illustrated by FIG. 6, to the second position, as illustrated by FIG. 9. The difference between the first position of FIG. 6 and the second position of FIG. 9 is further illustrated by FIG. 7, which is a cross-sectional side view of the paddle of FIG. 6 in a first position, and FIG. 10, which is a cross-sectional side view of the paddle of FIG. 9 in a second position. As illustrated, the position of the locator pin 54 remains constant relative to the position of the first paddle blade 44 and the shaft 46. In turn, the locator pin 54 and the first paddle blade 44 rotate within the sleeve 50. As a paddler moves the first handle 68 towards the paddle blade 44, this movement will produce rotation of the shaft 46 and the attached blade 44. In various implementations, the paddler may move the first handle towards the paddle blade 44 while inserting the paddle into the water for a power stroke and may in turn have the face of the paddle blade rotated perpendicular to the direction of motion of the power stroke. Subsequently, moving the first handle 68 and attached sleeve 50 away from the paddle blade 44 will reverse this rotation and return the paddle shaft and blades to its first starting position. In various implementations, as the paddler lifts the paddle out of the water the first handle may move away from the paddle blade 44 (and may be assisted by the spring 60) and the face of the paddle may rotate substantially parallel to the direction of motion of the paddle. This paddle shaft 46 and blade 44 rotation is achieved without any rotation of the paddle handles. Thus, when the paddle blade 44 immersed in the water is perpendicular to the path of movement of the watercraft, as the paddle blade 44 is pushed backwards it will produce a forward force. As the paddle blade 44 is pushed forward out of the water, it will present minimal surface area to any headwind. In this manner, the paddle 42 may be considered self-feathering as it rotates with the movement of a single handle along the length of the shaft 46. In other implementations, the helical opening 52 of the sleeve 50 may be oriented in the opposite direction, resulting in the paddle blade rotating in an opposite direction.

In places where the description above refers to particular implementations of paddles and implementing components, sub-components, methods and sub-methods, it should be readily apparent that a number of modifications may be made without departing from the spirit thereof and that these implementations, implementing components, sub-components, methods and sub-methods may be applied to other paddles.

What is claimed is:

1. A paddle comprising:
   at least one paddle blade coupled to a shaft;
   a sleeve coupled over the shaft, the sleeve comprising a helical opening;
   a locator pin coupled to the shaft and extending through the helical opening; and
   a first handle fixedly coupled to the sleeve;
   wherein the paddle blade is configured to rotate from a first position corresponding to the locator pin positioned at a first location in the helical opening to a second position corresponding to the locator pin positioned at a second location in the helical opening.

2. The paddle of claim 1, further comprising a second handle coupled around the shaft.

3. The paddle of claim 2, wherein the second handle is fully rotatable about the shaft.

4. The paddle of claim 1, wherein the first handle is configured to rotate a predetermined number of degrees not more than 90 degrees.

5. The paddle of claim 1, wherein the helical opening comprises a first locking section at a first end of the helical opening and a second locking section at a second end of the helical opening.

6. The paddle of claim 1, wherein the locator pin comprises a bearing.

7. The paddle of claim 1, wherein the sleeve further comprises a second helical opening.

8. The paddle of claim 1, wherein a movement of the first handle along a length of the shaft is configured to be adjustably restricted.

9. The paddle of claim 1, wherein the sleeve is configured to slide along a length of the shaft a predetermined distance not more than a length of the helical opening from a first end of the helical opening to a second end of the helical opening.

10. A paddle comprising:
a first paddle blade coupled to a first end of a shaft;
a second paddle blade coupled to a second end of the shaft opposite the first end;
a sleeve coupled over the shaft, the sleeve comprising a helical opening;
a locator pin coupled to the shaft and extending through the helical opening;
a first handle coupled to the shaft and fixedly coupled to the sleeve; and
a second handle coupled to shaft;
wherein the sleeve is configured to slide along a length of the shaft from a first position to a second position; and
wherein the shaft is configured to rotate relative to the sleeve when the sleeve slides along the length of the shaft from the first position to the second position.

11. The paddle of claim 10, wherein the second handle is configured to fully rotate about the shaft.

12. The paddle of claim 10, wherein the helical opening comprises a first non-helical end and a second non-helical end.

13. The paddle of claim 10, wherein the helical opening extends not more than 90 degrees.

14. The paddle of claim 10, wherein the first handle and the second handle comprise compressible material.

15. A paddle comprising:
a paddle blade coupled to a first end of a shaft;
a sleeve coupled over the shaft, the sleeve comprising a helical opening;
a locator pin coupled to the shaft and extending through the helical opening;
a spring coupled over the shaft between the sleeve and the paddle blade; and
a first handle fixedly coupled to the sleeve.

16. The paddle of claim 15, wherein the paddle is a single bladed paddle.

17. The paddle of claim 15, wherein the shaft is configured to rotate relative to the sleeve a predetermined number of degrees not more than 90 degrees.

18. The paddle of claim 15, wherein the locator pin comprises a bearing.

19. The paddle of claim 15, wherein the first handle is slidably coupled to the shaft.

20. The paddle of claim 15, wherein the spring is configured to compress during a portion of a paddle stroke.

* * * * *